United States Patent
Vercamer et al.

(10) Patent No.: US 12,491,996 B2
(45) Date of Patent: Dec. 9, 2025

(54) CRYOGENIC TANK FOR AN AIRCRAFT AND AIRCRAFT INCLUDING SUCH A TANK

(71) Applicant: Airbus Operations SAS, Toulouse (FR)

(72) Inventors: Tanguy Vercamer, Toulouse (FR); Benoît Penven, Toulouse (FR); Frédéric Goupil, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 342 days.

(21) Appl. No.: 17/991,982

(22) Filed: Nov. 22, 2022

(65) Prior Publication Data
US 2023/0159165 A1    May 25, 2023

(30) Foreign Application Priority Data
Nov. 25, 2021 (FR) ...................... 2112543

(51) Int. Cl.
*F17C 1/16* (2006.01)
*B64D 1/00* (2006.01)
*F17C 1/12* (2006.01)

(52) U.S. Cl.
CPC .................. *B64D 1/00* (2013.01); *F17C 1/12* (2013.01); *F17C 2201/0109* (2013.01);
(Continued)

(58) Field of Classification Search
CPC ...... B64D 1/00; F17C 1/12; F17C 2201/0109; F17C 2203/012; F17C 2203/0391;
(Continued)

(56) References Cited

U.S. PATENT DOCUMENTS 4,548,335 A * 10/1985 Remes .................. F17C 13/086
                                                220/560.1
4,765,507 A *  8/1988 Yavorsky ................. F17C 1/16
                                                220/661
(Continued)

FOREIGN PATENT DOCUMENTS

CN       203771028 U    8/2014
DE    202005006024 U1   7/2005
(Continued)

OTHER PUBLICATIONS

French Search Report dated Jul. 8, 2022; priority document.

*Primary Examiner* — Don M Anderson
*Assistant Examiner* — Elizabeth J Volz
(74) *Attorney, Agent, or Firm* — Greer, Burns & Crain, Ltd.

(57) ABSTRACT

A storage tank for a cryogenic fluid including an inner tank that is configured to store the fluid and that is seated in an outer envelope, the inner tank and the outer envelope having a shared longitudinal axis, such that a thermal insulation volume surrounds the inner tank, and wherein the outer envelope surrounds the volume about the inner tank. The tank has at least one damping element made of a deformable material positioned between one end of the inner tank and the outer envelope to wedge the inner tank against the outer envelope. This enables a reliable sliding mechanical link to be formed between at least one end of the inner tank and the outer envelope of the tank, thereby increasing resistance to wear and facilitating assembly of the tank.

8 Claims, 6 Drawing Sheets

(52) U.S. Cl.
CPC  *F17C 2203/012* (2013.01); *F17C 2203/0391* (2013.01); *F17C 2203/0629* (2013.01); *F17C 2221/012* (2013.01); *F17C 2223/0161* (2013.01); *F17C 2270/0189* (2013.01)

(58) Field of Classification Search
CPC ........ F17C 2203/0629; F17C 2221/012; F17C 2223/0161; F17C 2270/0189
USPC ...................................................... 220/560.1
See application file for complete search history.

(56) References Cited

U.S. PATENT DOCUMENTS

| | | |
|---|---|---|
| 2014/0166662 A1 | 6/2014 | Snyder et al. |
| 2017/0130900 A1 | 5/2017 | Strange et al. |
| 2021/0164614 A1* | 6/2021 | Fournel ..................... F17C 1/00 |

FOREIGN PATENT DOCUMENTS

| | | | | |
|---|---|---|---|---|
| EP | 3458769 B1 | | 7/2020 | |
| FR | 3078764 | * | 9/2019 | .............. F17C 30/08 |
| FR | 3078764 A1 | | 9/2019 | |

\* cited by examiner

CRYOGENIC TANK FOR AN AIRCRAFT AND AIRCRAFT INCLUDING SUCH A TANK

CROSS-REFERENCES TO RELATED APPLICATIONS

This application claims the benefit of the French patent application No. 2112543 filed on Nov. 25, 2021, the entire disclosures of which are incorporated herein by way of reference.

FIELD OF THE INVENTION

The present invention relates to a cryogenic fluid tank. More specifically, the invention relates to a liquid hydrogen storage tank for storing hydrogen on board an aircraft, and an aircraft carrying such a storage tank.

BACKGROUND OF THE INVENTION

Liquid hydrogen (or more specifically liquid dihydrogen) can be used as a power source on board an aircraft to power a fuel cell, or to operate a direct combustion. Storing liquid hydrogen used on board an aircraft requires very specific precautions, given the high flammability of hydrogen in the presence of oxygen. The hydrogen distribution network on board the aircraft, as well as the storage tanks, must be designed to prevent all risk of leaks, and to do so must have numerous features that are compiled and described in the manufacturing, testing and certification standards. In consideration of the space constraints in an aircraft, the hydrogen is preferably stored in liquid form, for example at a temperature of −253° C. (20K). Such a storage temperature impacts the distribution and storage installations, and potentially the elements close to these installations.

Liquid hydrogen storage tanks are commonly double tanks, notably made of aluminum and/or one or more composite materials. Most commonly, an inner tank is arranged inside an outer tank, also referred to as the outer envelope, and the volume between these two tanks helps to provide thermal insulation. The mechanical properties of the different materials vary as a function of temperature, and the temperature of the components of a hydrogen tank therefore varies between different usage phases (empty, filling, use, etc.). Consequently, depending on the structure of a liquid hydrogen tank, there may be significant mechanical stresses on account of the differences in coefficient of expansion between different materials and/or in expansion between the different elements.

Sliding mechanical links (or sliding links) are therefore provided between the inner tank and the outer envelope of a liquid hydrogen tank, for example using a sleeve that slides between two cylindrical necks, of which one cylindrical neck is arranged at the end of the inner tank (and outside the tank) and the other cylindrical neck is arranged at the end of the outer envelope (and inside the outer envelope or about an opening to the outside thereof). There are drawbacks to such a structure enabling a sliding link between the respective ends of the inner tank and the outer envelope positioned on the same side (pole) of a hydrogen tank. It is notably difficult to determine certain load conditions on account of variations in temperature conditions and inertial forces. Furthermore, fatigue may weaken the elements of such a structure as a result of the repeated movements, and there is a risk of jamming resulting from friction wear. Furthermore, the assembly methods may be complex since such structures tolerate little or no fitting tolerances in terms of the coaxiality of an inner tank and an outer envelope of such a tank. The situation can be improved.

SUMMARY OF THE INVENTION

One objective of the present invention is to propose a cryogenic tank for an aircraft that overcomes at least some of the drawbacks of the prior art.

For this purpose, a storage tank is proposed for a cryogenic fluid comprising an inner tank that is arranged to store the fluid and that is seated in an outer envelope, the inner tank and the outer envelope having a shared longitudinal axis, such that a thermal insulation volume surrounds the inner tank, and the outer envelope surrounds the volume about the inner tank, the tank being such that at least one damping element made of a deformable material (notably a flexible material) is inserted between one end of the inner tank and the outer envelope to wedge the inner tank against the outer envelope.

Advantageously, this enables a reliable sliding mechanical link to be formed between the inner tank, or more specifically at least one of the ends thereof, and the outer envelope, thereby increasing resistance to wear and facilitating assembly of the tank.

The storage tank for a cryogenic fluid according to the invention may also include the following features, taken individually or in combination:

The shared longitudinal axis of the inner tank and the outer envelope defines a direction X, and the damping element is fastened firstly to the end of the inner tank and secondly to the outer envelope, and is arranged to create the wedge by positioning the end of the inner tank in relation to the outer envelope when the end of the inner tank moves in translation along the direction X.

First fastening means are arranged to attach the damping element to the end of the inner tank and second fastening means are arranged to attach the damping element to an inner surface of the outer envelope, the attachments of the damping element preferably being removable.

The damping element is ring-shaped, the first fastening means comprise a sleeve fastened to the end of the inner tank and have a first shoulder and a thread that are arranged to fasten the damping element about a portion of the sleeve, against the first shoulder, and to hold the damping element against the first shoulder by tightening an assembly comprising a washer and a nut onto the sleeve portion, and the second fastening means comprise a neck formed about an opening at one end of the outer envelope positioned on the same side of the tank as the end of the inner tank, the neck having a second shoulder, and a locking ring crimped onto the neck and arranged to hold the damping element against the second shoulder.

The damping element is ring-shaped, the first fastening means comprise a sleeve fastened to the end of the inner tank and have a first shoulder and a thread that are arranged to fasten the damping element about a portion of the sleeve, against the first shoulder, and to hold the damping element against the first shoulder by tightening a first assembly comprising a washer and a nut onto the sleeve portion, and the second fastening means comprise a neck formed about an opening at one end of the outer envelope positioned on the same side of the tank as the end of the inner tank, the inner surface of the neck having a slot into which is inserted a ring-shaped metal insert or an internal thread into which a ring-shaped metal insert is screwed, the inner surface of the insert having a second shoulder and a thread that are arranged to hold the damping element against the second shoulder by tightening an assembly comprising a washer and a nut in the ring-shaped metal insert.

The deformable material is an elastomer.

The deformable material has a plurality of metal inserts arranged parallel to the direction X.

The invention also relates to an aircraft including at least one storage tank for a cryogenic fluid as described above.

BRIEF DESCRIPTION OF THE DRAWINGS

The aforementioned and other features of the present invention are set out more clearly in the description given below of an example embodiment, the description being provided with reference to the attached drawings, in which.

DETAILED DESCRIPTION OF THE PREFERRED EMBODIMENTS

Figure 1:
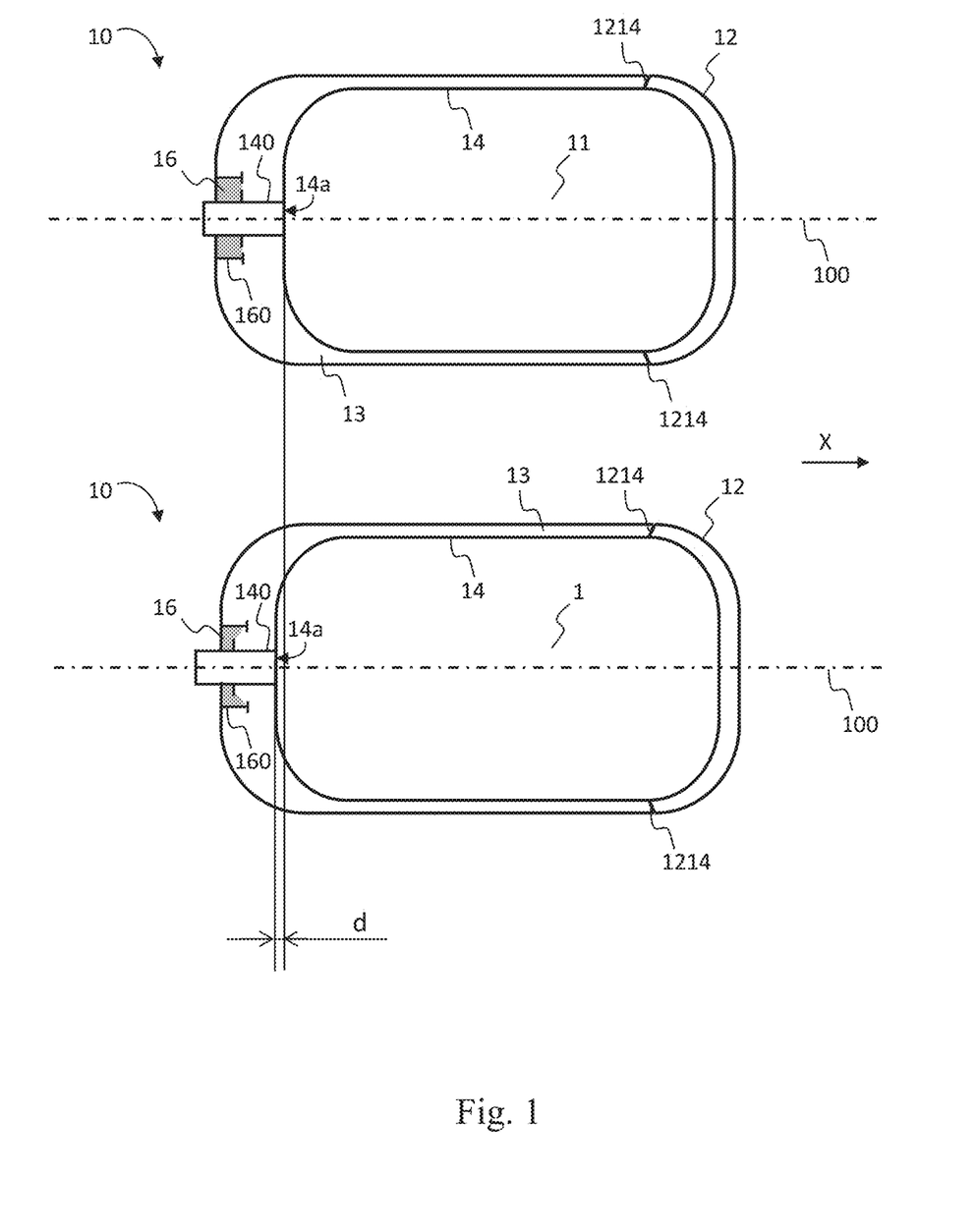
FIG. 1 is a block diagram showing the arrangement of a cryogenic tank according to a first embodiment.

FIG. 1 is a schematic view of a cryogenic tank 10 arranged to store liquid hydrogen on board an aircraft, according to one embodiment. The term "cryogenic tank" here refers to a tank arranged to store a cryogenic liquid, such as hydrogen in liquid form, for example. In this description, the terms "hydrogen" and "liquid hydrogen" are used interchangeably and refer to hydrogen (H2) in liquid form, potentially combined with an inert gas or hydrogen in gaseous state. The upper part of FIG. 1 shows the tank 10 containing a quantity of liquid hydrogen 11 and the lower part of FIG. 1 shows the tank 10 containing only ambient air 1. The length of the inner tank 14 is therefore increased by a length d by expansion when containing ambient air 1, compared to the length of the tank containing liquid hydrogen 11. The temperature of the hydrogen in liquid state causes a contracted form of the inner tank 14 compared to the form of the tank at ambient temperature. The hydrogen tank 10 comprises an inner tank 14 and an outer envelope 12 that are arranged about the same longitudinal axis 100. The inner tank 14 and the outer envelope 12 both have an overall cylindrical shape and have ends with an overall spherical shape referred to as poles. The volume of the inner tank 14 is less than the volume of the outer envelope 12, such that a thermal insulation volume 13 is formed between the outer surface of the inner tank 14 and the inner surface of the outer envelope 12. According to one embodiment, a vacuum can be created in the thermal insulation volume 13 during manufacture of the tank 10 or by using a vacuum pump when using the tank in an installation. According to one variant, an insulating material or several layers of insulating material are used to provide thermal insulation between the inner tank 14 and the outer envelope 12.

According to one embodiment, the inner tank 14 and the outer envelope 12 are held apart from one another at or in the vicinity of one of the poles of the tank 10 by a set of spacers 1214 arranged regularly and fastened between the outer surface of the inner tank 14 and the outer envelope 12. Furthermore, a sliding link between the end 14a of the inner tank 14 and the outer envelope 12 is formed at the opposite pole of the tank 10, in order to limit the mechanical stresses caused by expansion or contraction of the inner tank 14 during variations of temperature or caused by the pressure of the hydrogen contained in the inner tank 14, notably during variations in temperature of the inner tank 14 caused by the temperature of the content thereof. According to one embodiment, the spacers 1214 are replaced by equivalent fastening means 1214 that are arranged to minimize the heat bridges between the inner tank 14 and the outer envelope 12, thereby reducing the effect of the heat bridges. For example, the spacers 1214 are replaced by recessed links enabling the transfer of forces to the inner tank 14 in a direction parallel to the longitudinal axis 100 of the inner tank 14, and more generally of the tank 10. The sliding link arranged at the other end of the tank is primarily used to offset the expansion in a direction parallel to the longitudinal axis of the tank 10.

Advantageously, the sliding mechanical link between the end 14a of the inner tank 14 and the end of the outer envelope 12 arranged opposite the end 14a of the inner tank 14 includes a damping element 16 that is arranged to wedge the end 14a against the outer envelope 12. The term "wedge" here refers to a fitted position to efficiently hold the end 14a of the inner tank in relation to the pole of the outer envelope 12 facing the end, thereby holding the inner tank 14 in relation to the outer envelope 12, while providing a sliding link able to offset the dimensional variations of the elements, notably the inner tank 14. A wedge created by the damping element 16 between the end 14a of the tank 14 and the pole of the outer envelope 12 facing the end therefore means that an element rigidly connected to the end 14a is positioned to bear against a first surface of the damping element 16 and that an element rigidly connected to the pole of the outer envelope 12 positioned on the same side of the tank 10 as the end 14a of the inner tank 14 bears against at least one second surface of the damping element 16, the first and second surfaces facing one another overall such that the damping element 16 is held (sandwiched) between the end 14a of the inner tank 14 and the pole of the outer envelope 12 facing the end, and creates a wedge at least in a direction X parallel to the shared longitudinal axis 100 of the inner tank 14 and the outer envelope 12. Advantageously, the damping element 16 is made of a deformable material, which enables the element to hold the inner tank 14 in a stable position while offsetting a variation by a length d of the length of the inner tank 14 as a function of temperature and of internal pressure, notably when there is a cryogenic fluid such as liquid hydrogen in the inner tank 14. The term "deformable material" here refers to a material having mechanical strength and deformation characteristics similar to an elastomeric material.

According to one embodiment, the damping element 16 is made of an elastomeric material or a material having compressibility and elasticity characteristics similar to an elastomer. Advantageously, first fastening means 140 are arranged and configured to fasten the damping element 16 to the end 14a of the inner tank 14 and second fastening means 160 are arranged and configured to fasten the damping element 16 to the pole of the outer envelope 12 positioned on the same side of the tank 10 as the end 14a (at the same pole).

Advantageously, the fastening means 140, 160 and the damping element 16 are configured to together form a wedge in three directions orthogonal to one another, of which direction X is parallel to the shared longitudinal axis 100. Indeed, the forces of inertia and acceleration present during the flight phases and taxiing of an aircraft carrying the tank 10 or a similar tank are such that it is ideally beneficial to create a wedge along the roll, pitch and yaw axes of the aircraft, in addition to offsetting the dimensional variations of the described elements related to the temperature variations in the tank 10. For this purpose and according to one embodiment, the damping element 16 takes the form of a hoop or ring of square, rectangular or any other section, threaded onto a sleeve fastened to the end 14a of the inner tank 14 and seated in a neck or a slot arranged in a polar opening of the outer envelope 12. Naturally, such a structure is not limiting and other structures performing equivalent wedging functions between the end 14a of the inner tank 14 and the outer envelope 12 can be installed about the damping element 16.

Advantageously, the near-incompressibility properties of the elastomer provide a good compromise between the wedge created and the shear strength required in consideration of the deformation of the inner tank 14 (contraction or expansion) and the deformation stresses resulting therefrom on the damping element 16 rigidly connected both to the first fastening means 140 and the second fastening means 160.

According to one embodiment of the invention, metal inserts are provided (inserted during manufacture) in the damping element 16 in order to adjust the properties of incompressibility and shear strength in different directions Therefore, according to one embodiment, metal inserts in the form of plates are arranged parallel to the direction X (and therefore to the longitudinal axis 100).

Figure 2:
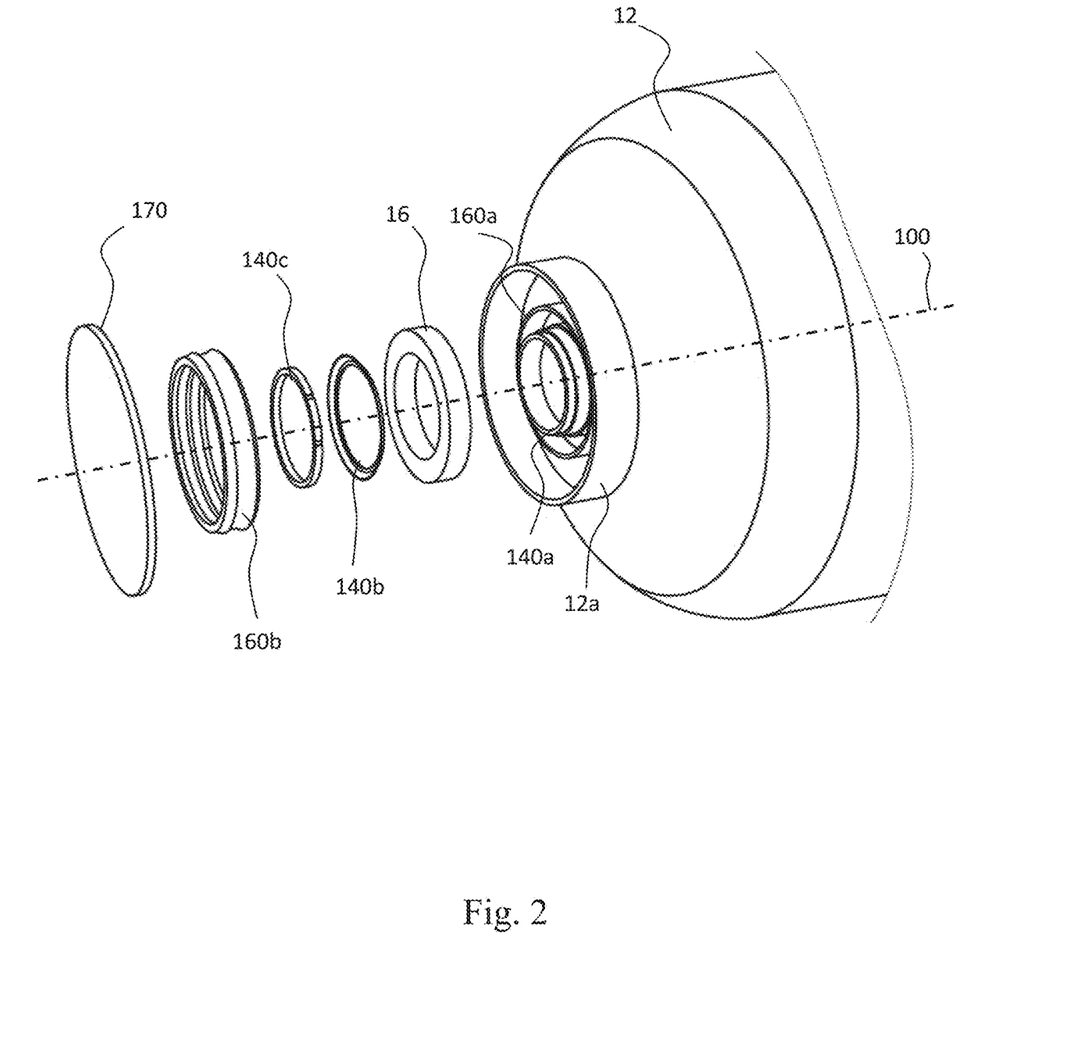
FIG. 2 is a perspective view of a fastening assembly between an inner tank and an outer envelope of a tank as shown in FIG. 1, before assembly.

FIG. 2 is a perspective view showing implementation details of the first fastening means 140 between the damping element 16 and the inner tank 14 and implementation details of the second fastening means 160 between the damping element 16 and the outer envelope 12, about a polar opening in the envelope 12 of the tank 10. FIG. 2 is an exploded view of an arrangement of the fastening elements, before assembly, that are arranged to be assembled concentrically or near-concentrically about a sleeve 140a rigidly connected to the end 14a of the inner tank 14. The damping element 16, for example in the form of a ring of square section, is configured firstly to be threaded onto the sleeve 140a rigidly connected to the end 14a of the inner tank 14 (not shown in FIG. 2), and secondly to also be at least partially seated in the neck 160a formed about the polar opening in the outer envelope 12. The damping element 16 is therefore arranged to be positioned between the sleeve 140a and the neck 160a. The sleeve 140a has a shoulder 1400 (shown in FIG. 3) and an end thread such that the damping element 16 can be locked in position on the sleeve 140a against the shoulder 1400 using a washer 140b and a nut 140c. According to one embodiment, the washer 140b and the nut 140c are serrated to enable locking in position after tightening. To fasten the damping element 16 in the neck 160a arranged about the polar opening in the outer envelope 12, a locking ring 160b is designed to be positioned on the outer surface of the neck 160a, then crimped onto the neck. According to one embodiment, the locking ring 160b is fastened onto the neck 160a by mechanical crimping or magnetic crimping, this method using magnetic pulses to deform two parts, one of which is crimped onto the other. A polar cover 170 is provided and configured to close the polar opening in the envelope 12 after assembly of the aforementioned elements comprising some or all of the first fastening means 140 and the second fastening means 160 of the damping element 16. The polar cover 170 is positioned on the second neck 12a, formed in the outer envelope 12, arranged about the polar opening and having a diameter greater than the diameter of the neck 160a.

Figure 3:
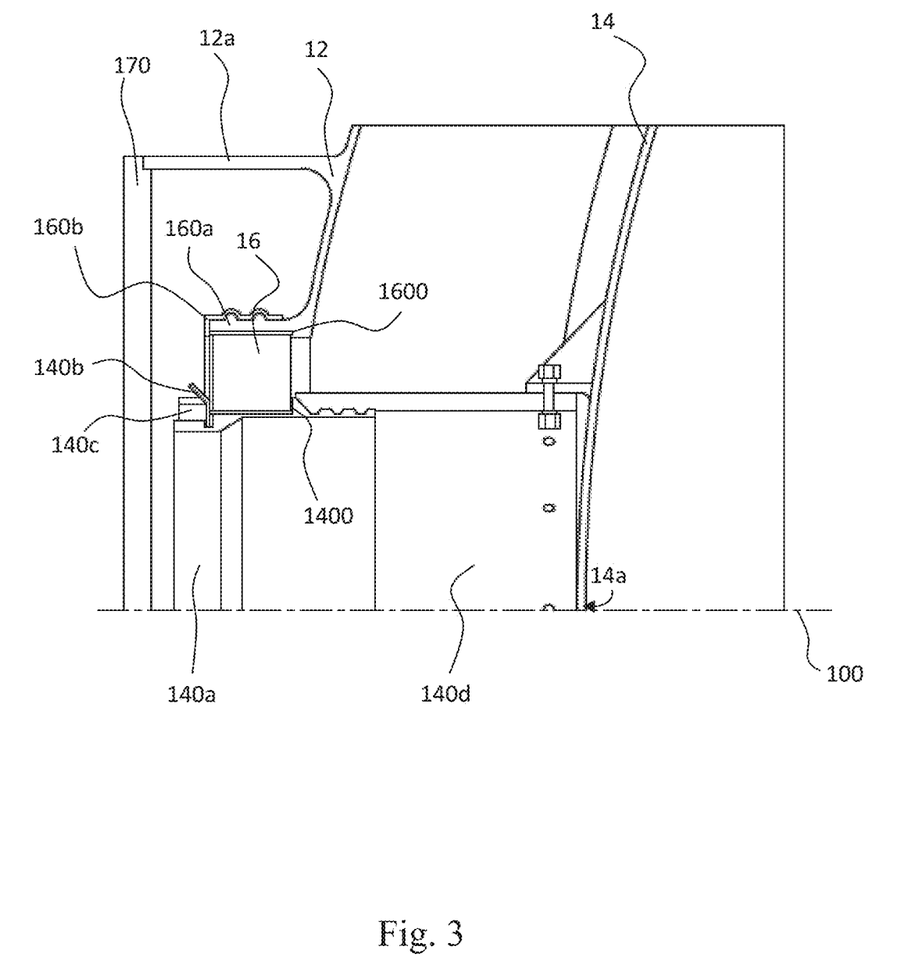
FIG. 3 is a cross section of the fastening assembly shown in FIG. 2, after assembly.

FIG. 3 is a longitudinal cross section taken along a plane containing the shared longitudinal axis 100 of the inner tank 14 and the outer envelope 12, showing the elements described in FIG. 2 following assembly. The sleeve 140a onto which the damping element 16 is threaded is held on the end 14a of the inner tank 14 by means of a primary sleeve 140d. Accordingly, the sleeve 140a and the primary sleeve 140d together form a single sleeve, one portion of which is the sleeve 140a. Advantageously and according to an example embodiment, the sleeve 140a is made of titanium and the sleeve 140d is made of a composite material to minimize the thermal transfer towards the inner tank 14. In this example, the sleeve 140a is incorporated into the drape forming of the sleeve 140d and slots made in the sleeve 140a guarantee good cohesion of the fibers of the sleeve 140d on the sleeve 140a, these latter fitting the shape of the slots during drape forming of the sleeve 140d. FIG. 3 shows the positioning of the damping element 16 against the shoulder 1400 arranged on the outer surface of the sleeve 140a and the fastening of the damping element 16 on the sleeve 140a using a nut/washer assembly. A washer 140b is threaded onto the end of the sleeve 140a to bear against a face of the damping element 16 on the side of the damping element opposite a face bearing against the shoulder 1400. A nut 140c is then tightened onto a thread arranged on the end sleeve 140a so that the damping element 16 is then sandwiched between the washer 140b held by the nut 140c and the shoulder 1400 of the sleeve 140a.

Furthermore, the neck 160a arranged about the polar opening is configured to provide a seat for the damping element 16, in conjunction with the sleeve 140a. Once in position in this seat, the damping element 16 is prevented from moving in translation in the direction X by assembling and tightening the locking ring 160b onto the neck 160a.

According to the embodiment described here, the first means 140 for fastening the damping element 16 to the inner tank 14 therefore comprise the primary sleeve 140d fastened to the end 14a of the inner tank 14, the threaded sleeve 140a, the washer 140b, the nut 140c and the shoulder 1400, and the second means 160 for fastening the damping element 16 to the outer envelope 12 therefore comprise the neck 160a, a shoulder 1600 formed in the neck 160a, and the locking ring 160b crimped onto the neck 160a. Naturally, other fastening means performing equivalent functions of fastening the damping element 16 to both the inner tank 14 and the outer envelope 12, thereby wedging the tank against the envelope, can be used.

According to a variant embodiment, the sleeve 140a and the primary sleeve 140d can be replaced by a single sleeve if the material used to manufacture the sleeve has low thermal conductivity (such as titanium).

FIG. 3 also shows the assembly of the polar cover 170 on the second neck 12a arranged at the end of the outer envelope 12.

Figure 4:
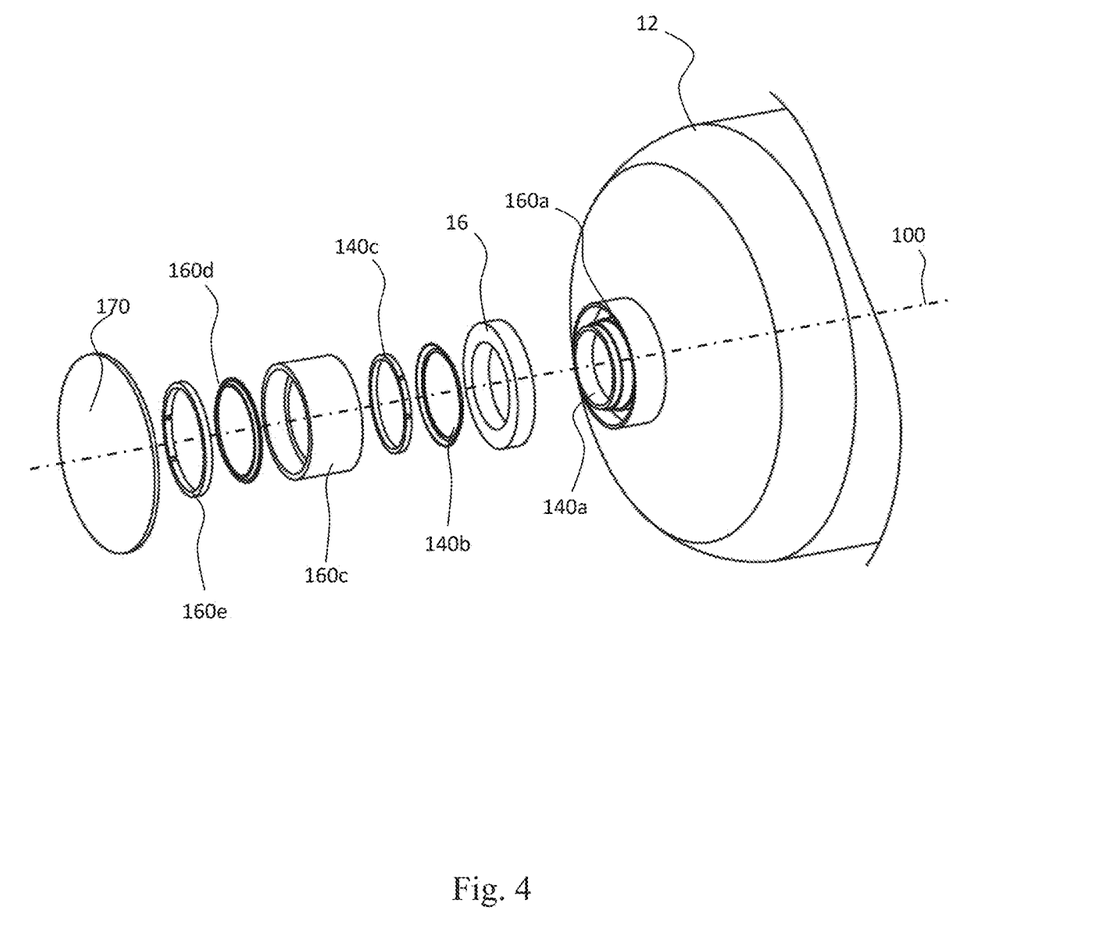
FIG. 4 is a perspective view of the fastening assembly between an inner tank and an outer envelope of a cryogenic tank as shown in FIGS. 2 and 3, according to a variant embodiment and before assembly.

FIG. 4 is a perspective view showing a variant of the embodiment illustrated and described in relation to the FIG. 2, before assembly of the elements. According to this variant embodiment, only the neck 160a is formed about the polar opening of the outer envelope 12 of the tank 10, i.e., the second neck 12a described above is not used. According to this variant, the means 140 for fastening the damping element 16 to the inner tank 14 are unchanged and as described above, but the means 160 for fastening the damping element 16 to the outer envelope 12 are different. According to this variant embodiment, a slot 160r is arranged in the inner surface of the neck 160a and a metal insert 160c is seated in this slot, mounted using liquid nitrogen assembly or inserted by molding, for example. According to another variant, the slot 160r is replaced by a threaded hole in the inner surface of the neck 160a, and the insert 160c, which then has a thread on the outer surface thereof, is screwed into the threaded hole. The metal insert 160c has an overall ring-shape and a thread is formed in the inner surface thereof, as well as the shoulder 1600 machined outside the threaded area. The thread formed in the inner surface of the metal insert 160c and the shoulder 1600 are configured so that the damping element 16 can be held between a washer 160d and the shoulder 1600 and so that a nut 160e can lock the washer 160d in position. Thus, in the variant embodiment in which the insert 160c is screwed into the neck 160a of the outer envelope 12, the insert has two threads: a first external thread for fastening to the neck 160a, and a second internal thread for screwing in the nut 160e. Advantageously, the washer 160d also enables the nut 160e to be locked in rotation by folding at least one of the tabs thereof into one of the notches of the nut 160e. Thus, the portion of the damping element 16 furthest away radially from the longitudinal axis 100 is sandwiched between the washer 160d and the shoulder 1600 in the ring-shaped metal insert 160c. According to this variant, the diameter of the cover 170 is reduced to fit onto the neck 160a and is arranged to close the polar opening of the outer envelope 12.

Figure 5:
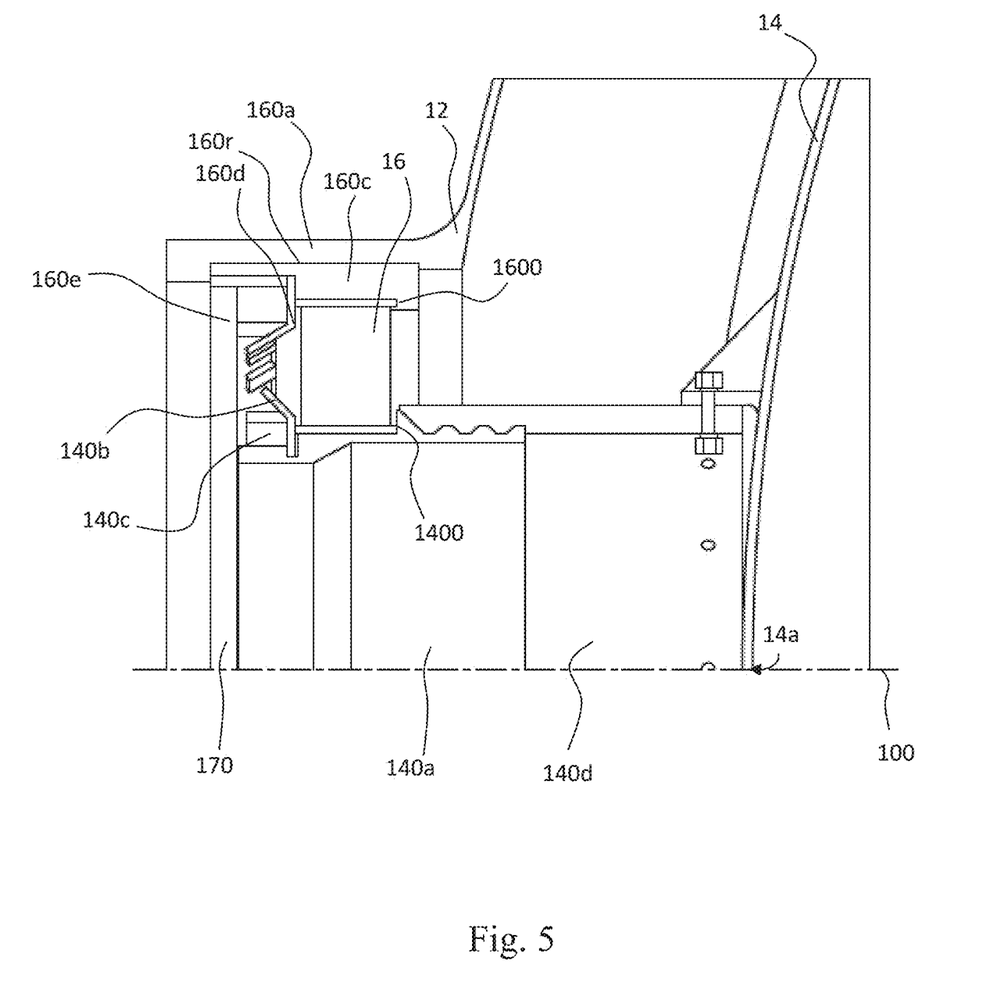
FIG. 5 is a cross section of the fastening assembly shown in FIG. 4, after assembly; and, FIG. 6 shows an aircraft including a cryogenic tank as shown in FIG. 1.

FIG. 5 is a longitudinal cross section taken along a plane containing the shared longitudinal axis 100 of the inner tank 14 and the outer envelope 12, showing the elements described in FIG. 5 following assembly of the sliding link.

Advantageously, the sliding links working according to the described examples using a damping element made of a flexible deformable material, such as an elastomer, possibly including reinforcing metal inserts or more exactly metal inserts adjusting the properties of near-incompressibility and shear strength, provide a sliding link between at least one end of the inner tank and a pole of the outer envelope of a cryogenic tank positioned on the same side as the end, by wedging and with no risk of deterioration related to repeated friction of one part with another part.

Naturally, the example embodiments described are not limiting and other variants are possible. For example, depending on the material used to manufacture the neck 160a, the thread receiving the nut 160e and the shoulder 1600 can be formed directly in the inner surface of the neck 160a. Although the metal insert is required if the neck 160a is made of composite material (for example a material based on glass fibers or carbon fibers), and preferable if the neck 160a is made of aluminum alloy, it is optional if the neck 160a is made of steel.

Figure 6:
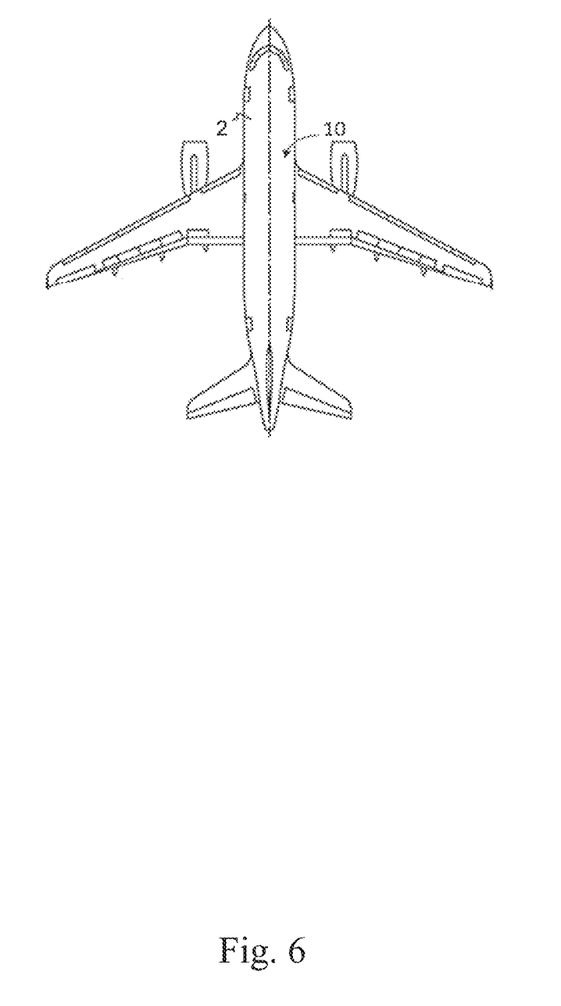

FIG. 6 shows an aircraft 2 comprising at least the cryogenic tank 10 or one or more similar tanks, i.e., having the described features of the tank 10. This is particularly advantageous on board an aircraft to overcome the stated problems with the cryogenic tank according to the prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A storage tank for a cryogenic fluid comprising:
an outer envelope, and
an inner tank that is configured to store said fluid and that is seated in the outer envelope,
the inner tank and the outer envelope having a shared longitudinal axis defining a direction X, such that a thermal insulation volume surrounds the inner tank, and wherein said outer envelope surrounds said volume about the inner tank,
at least one damping element made of a deformable material positioned between one end of said inner tank and said outer envelope to wedge the inner tank against the outer envelope,
said at least one damping element being fastened firstly to said end of the inner tank and secondly to said outer envelope, and being arranged to create said wedge by positioning said end of the inner tank in relation to said outer envelope when said end of the inner tank moves in translation along the direction X, and
first fastening means being arranged to attach said at least one damping element to the end of said inner tank and second fastening means being arranged to attach said at least one damping element to an inner surface of said outer envelope,
wherein said at least one damping element is ring-shaped,
wherein said first fastening means comprise a sleeve fastened to the end of the inner tank and have a first shoulder and a thread that are configured to fasten said at least one damping element about a portion of said sleeve, against said first shoulder, and to hold said at least one damping element against said first shoulder by tightening an assembly comprising a washer and a nut onto said sleeve portion, and
wherein said second fastening means comprise
a neck formed about an opening at one end of the outer envelope positioned on the same side of the tank as the end of the inner tank, the neck having a second shoulder, and
a locking ring crimped onto said neck and configured to hold said at least one damping element against said second shoulder.

2. The storage tank for a cryogenic fluid according to claim 1, wherein the deformable material is an elastomer.

3. The storage tank for a cryogenic fluid according to claim 1, wherein the deformable material has a plurality of metal inserts arranged parallel to the direction X.

4. An aircraft including at least one storage tank for a cryogenic fluid according to claim 1.

5. A storage tank for a cryogenic fluid comprising:
an outer envelope,
an inner tank that is configured to store said fluid and that is seated in the outer envelope, the inner tank and the outer envelope having a shared longitudinal axis defining a direction X, such that a thermal insulation volume surrounds the inner tank, and wherein said outer envelope surrounds said volume about the inner tank, at least one damping element made of a deformable material positioned between one end of said inner tank and said outer envelope to wedge the inner tank against the outer envelope, said at least one damping element being fastened firstly to said end of the inner tank and secondly to said outer envelope, and being arranged to create said wedge by positioning said end of the inner tank in relation to said outer envelope when said end of the inner tank moves in translation along the direction X, and first fastening means being arranged to attach said at least one damping element to the end of said inner tank and second fastening means being arranged to attach said at least one damping element to an inner surface of said outer envelope, wherein said at least one damping element is ring-shaped, wherein said first fastening means comprise a sleeve fastened to the end of the inner tank and have a first shoulder and a thread that are configured to fasten said at least one damping element about a portion of said sleeve, against said first shoulder, and to hold said at least one damping element against said first shoulder by tightening an assembly comprising a washer and a nut onto said sleeve portion, and wherein said second fastening means comprise
- a ring-shaped metal insert, and
- a neck formed about an opening at one end of the outer envelope positioned on the same side of the tank as the end of the inner tank,
  - an inner surface of the neck having a slot into which the ring-shaped metal insert is inserted, or a threaded hole into which the ring-shaped metal insert is screwed,
  - an inner surface of said insert having a second shoulder and a thread that are arranged to hold said at least one damping element against said second shoulder by tightening an assembly comprising a washer and a nut in said ring-shaped metal insert.

6. The storage tank for a cryogenic fluid according to claim 5, wherein the deformable material is an elastomer.

7. The storage tank for a cryogenic fluid according to claim 5, wherein the deformable material has a plurality of metal inserts arranged parallel to the direction X.

8. An aircraft including at least one storage tank for a cryogenic fluid according to claim 5.

* * * * *